(12) United States Patent
Zack

(10) Patent No.: US 6,250,279 B1
(45) Date of Patent: Jun. 26, 2001

(54) ROTARY INTERNAL COMBUSTION ENGINE

(76) Inventor: Steven Zack, P.O. Box 116, Deep River, CT (US) 06417

( * ) Notice: Subject to any disclaimer, the term of this patent is extended or adjusted under 35 U.S.C. 154(b) by 0 days.

(21) Appl. No.: 09/603,799

(22) Filed: Jun. 26, 2000

Related U.S. Application Data

(60) Provisional application No. 60/070,491, filed on Jan. 5, 1998, and provisional application No. 60/124,426, filed on Mar. 15, 1999.

(51) Int. Cl.$^7$ .................................................. F02B 53/00
(52) U.S. Cl. ......................... 123/241; 123/200; 418/225
(58) Field of Search .................... 123/241, 200; 60/39.61; 418/225

(56) References Cited

U.S. PATENT DOCUMENTS 4,354,462 * 10/1982 Kuechler et al. .................. 123/241
4,562,802 * 1/1986 Groeger ............................. 123/241
4,896,633 * 1/1990 Junghans et al. .................. 418/225

* cited by examiner

Primary Examiner—Thomas Denion
Assistant Examiner—Thai-Ba Trieu
(74) Attorney, Agent, or Firm—Gene Scott-Patent Law & Venture Group

(57) ABSTRACT

An internal combustion engine with an interior annular surface. A rotary piston mount rotates within an engine block interior space. Several spherical pistons are urged radially outwardly from the rotary piston mount by an urging means, and move in a radial reciprocating motion within the rotary piston mount. A gas-producing means produces an expanding gas. The gas drives the spherical pistons and the rotary piston mount rotationally along the interior annular surface of the engine block.

4 Claims, 3 Drawing Sheets

ROTARY INTERNAL COMBUSTION ENGINE

The present application is related to two previously filed provisional patent applications having Ser. Nos. 60/070,491, and 60/124,426, and assigned filing dates of Jan. 5, 1998, and Mar. 15, 1999 respectively, which contain subject matter substantially the same as that described and claimed in the present application.

BACKGROUND OF THE INVENTION

1. Field of the Invention

This invention relates generally to internal combustion engines, and more particularly to a rotary internal combustion engine having spherical reciprocating pistons.

1. Description of Related Art

Internal combustion engines, specifically the four-stroke internal combustion engine, was first put to use in the motor car by Karl Benz in 1885. The most common form of internal combustion engine uses reciprocating pistons driven within separate and discrete cylinders by an ignited and expanding fuel mixture. Prior art references referring to internal combustion engines include the following: U.S. Pat. No. 03,651,638 "internal combustion engine"; U.S. Pat. No. 04058091 "internal combustion engine of a lean air-fuel mixture combustion type"; U.S. Pat. No. 05,960,752 "combustion control apparatus for spark ignition type 2-cycle internal combustion engine"; and for reference: U.S. Pat. Nos. 04,461,260; 04,429,533; 04,720,977; 04,300,486; 03,633,553. While at least one reference does teach a rotary piston mounted such as that utilized in the present invention, none utilize spherical pistons, a roller sealing means which isolates gas pressure zones within the uniform annular circular space, so as to increase the volatility and therefore the ignitibility of gases within the fuel ignition ports. In addition, none utilize an urging means providing a roller portion that makes rolling contact with the spherical pistons. Combustion chambers in the standard internal combustion engine require many more combustion temperature control points, moving parts, and frictional wear surfaces than the engine provided by the present invention. The present invention provides further related advantages as described in the following summary.

SUMMARY OF THE INVENTION

An internal combustion apparatus comprises an engine block providing an engine block interior space, and an interior annular surface. A rotary piston mount is adapted for rotational motion within the interior space of the engine block. The rotary piston mount defines a uniform annular circular space between the interior annular surface and the rotary piston mount. A plurality of spherical pistons are adapted for radial reciprocating motion within the rotary piston mount. The spherical pistons are urged in reciprocating radial motion within the rotary piston mount by an urging means forcing the pistons to be in rolling contact with the interior annular surface of the engine block. A means for producing an expanding gas so as to drive the spherical pistons and the rotary piston mount in rotational motion within the engine block is provided.

The combustion chamber shape is such that as the ball piston enters the chamber, as it passes the radius the ball will push up into a 90-degree angle. This provides the ball with one direction into the chamber. The combustion sphere extends the sphere of the inner crankcase sphere, which the ball rides on. This provides for full contact of the ball to the cooling surfaces, which provides for a constant controlled combustion temperature. Therefore noxious gases will not form nor will the fuel condense. This sphere also provides for sealing of the combustion surfaces. The exiting combustion surface is also spherical shaped and at an angle of 40-degrees providing for a one way exit out. This 40-degree angle will also force the ball piston back into its seat on the roller crank. The spark plug is near the top of the combustion chamber at a 30-degree angle providing for oxidation in the forward motion. The fuel and oxidizer injection port is at the top of the combustion chamber at TDC. At 90-degrees with respect to top dead center (TDC) the exhaust port is at a 30-degree angle providing an exit for the oxidized fuel.

The crankcase has an inner sphere for the ball piston to ride on as a guide and to provide constant cooling of the combustion surface. This sphere also provides for sealing of the combustion surfaces. The ball piston is ceramic coated to provide a cool surface for the oxidizer as no nitrogen is introduced to absorb heat. This ceramic also provides lubrication. The plunger assembly contains a plunger ball for contact with the ball piston to provide for friction reduced contact. The plunger assembly has a compression spring to provide for compression of the ball piston by forcing the piston up into the combustion chamber. This compression spring is variable in tension to provide for compression changes required by the use of alternate fuels. A thrust washer of bronze is used under the compression spring to provide for reduced friction and wear of the roller crank and compression spring. The roller crank provides a seat for the ball piston to ride on. It also provides the plunger assembly to produce compression as the ball piston moves into the combustion chamber. The combustion cycle begins at 10-degrees before TDC as the ball piston enters the combustion chamber. Injection of Fuel and oxygen into the combustion chamber begins at 3-degrees before TDC. The spark plug ignites at TDC providing combustion. Expanding gases provide the force necessary to move the ball piston. Expansion continues for 90-degrees and then the gases exit through the exhaust port. One combustion cycle is completed in each 90-degrees of engine rotation.

The present invention apparatus teaches certain benefits in construction and use that give rise to the objectives described below.

A further objective is to provide such an apparatus having rotational symmetry providing inherent balance.

A still further objective is to provide such an apparatus having reciprocating spherical pistons for eliminating sliding friction.

A still further objective is to provide such an invention capable of enhancing the ability of the volatile gases in the fuel to ignite by providing an inventive roller sealing means of isolating gas pressure zones within the uniform annular circular space.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
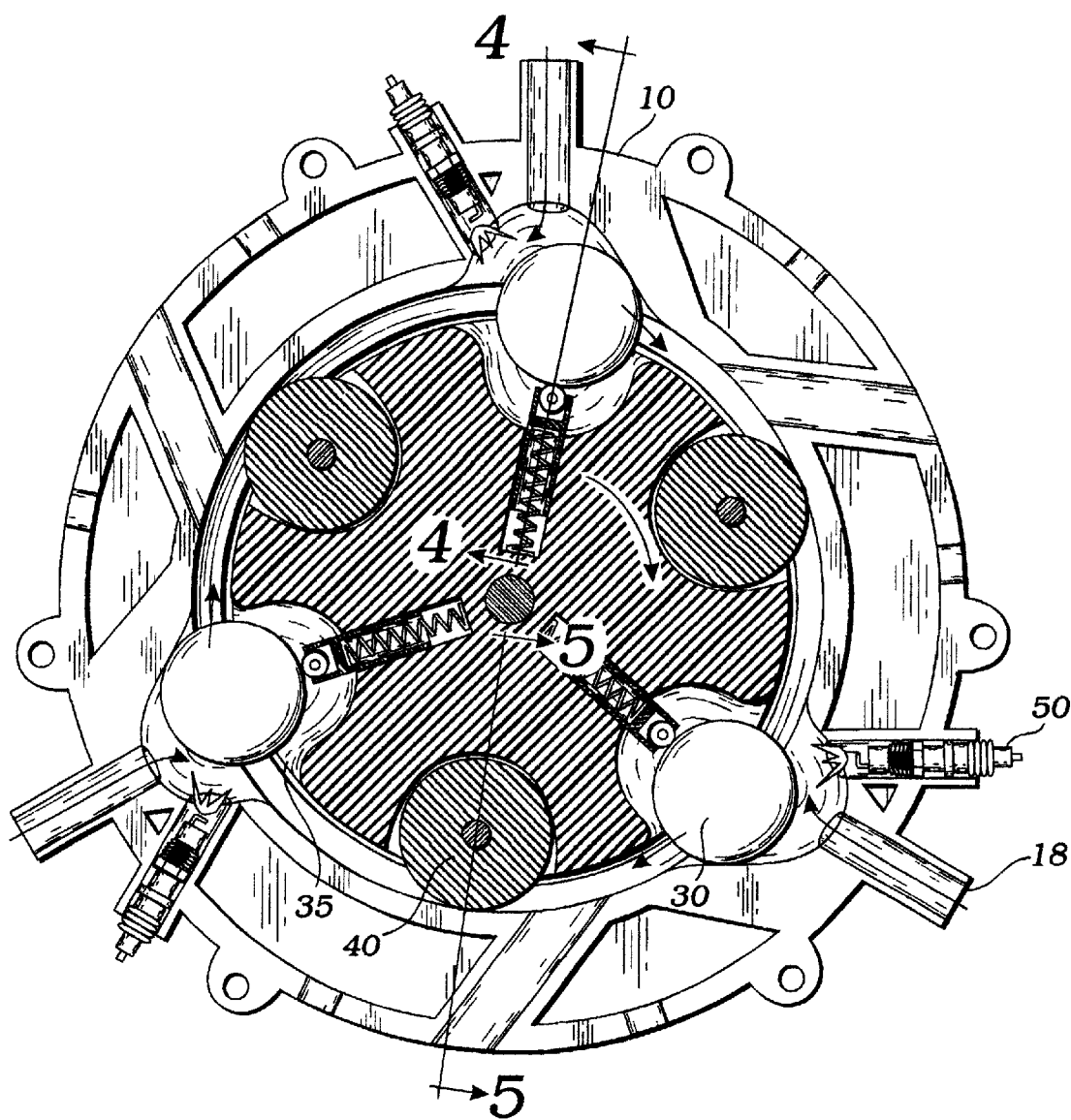
FIG. 1 is a front elevational sectional view of the preferred embodiment of the present invention, showing three spherical pistons moving within a cavity and positioned subsequent to ignition.

The above described drawing FIGS. 1–6 illustrate the invention, an internal combustion apparatus comprising an engine block 10 of generally circular conformation and providing an engine block interior space 12 also of circular conformation and having an interior annular surface 14. FIG. 1 shows this arrangement in cross section whereby circular symmetry extends into and out of the diagram as shown. A rotary piston mount 20 of generally circular cross section, as shown, is adapted by its rotational mount onto a crank shaft 70 for rotational motion within the engine block interior space 12. The rotary piston mount 20, by its size being smaller than the interior space 12, defines a uniform annular circular space 22 between the interior annular surface 14 and an outer surface of the rotary piston mount 20. This space 22 defines a chamber within which gases may be introduced in the engine and through which they are able to reach exhaust ports 19 once their energy is expended.

A plurality of spherical pistons 30 are adapted for radial reciprocating motion within the rotary piston mount 20 and this by being seated in spherical piston seats 24. The spherical pistons 30 are each urged radially outwardly from the rotary piston mount 20 by an urging means 35 so that the spherical pistons 30 are in rolling contact with the interior annular surface 14 of the engine block 10. The invention includes spark plug 50 or the equivalent thereof, wherein an expanding gas drives the spherical pistons 30 and the rotary piston mount 20 in rotational motion within the engine block 10, in this case in a clockwise direction as shown in FIG. 1.

Figure 2:
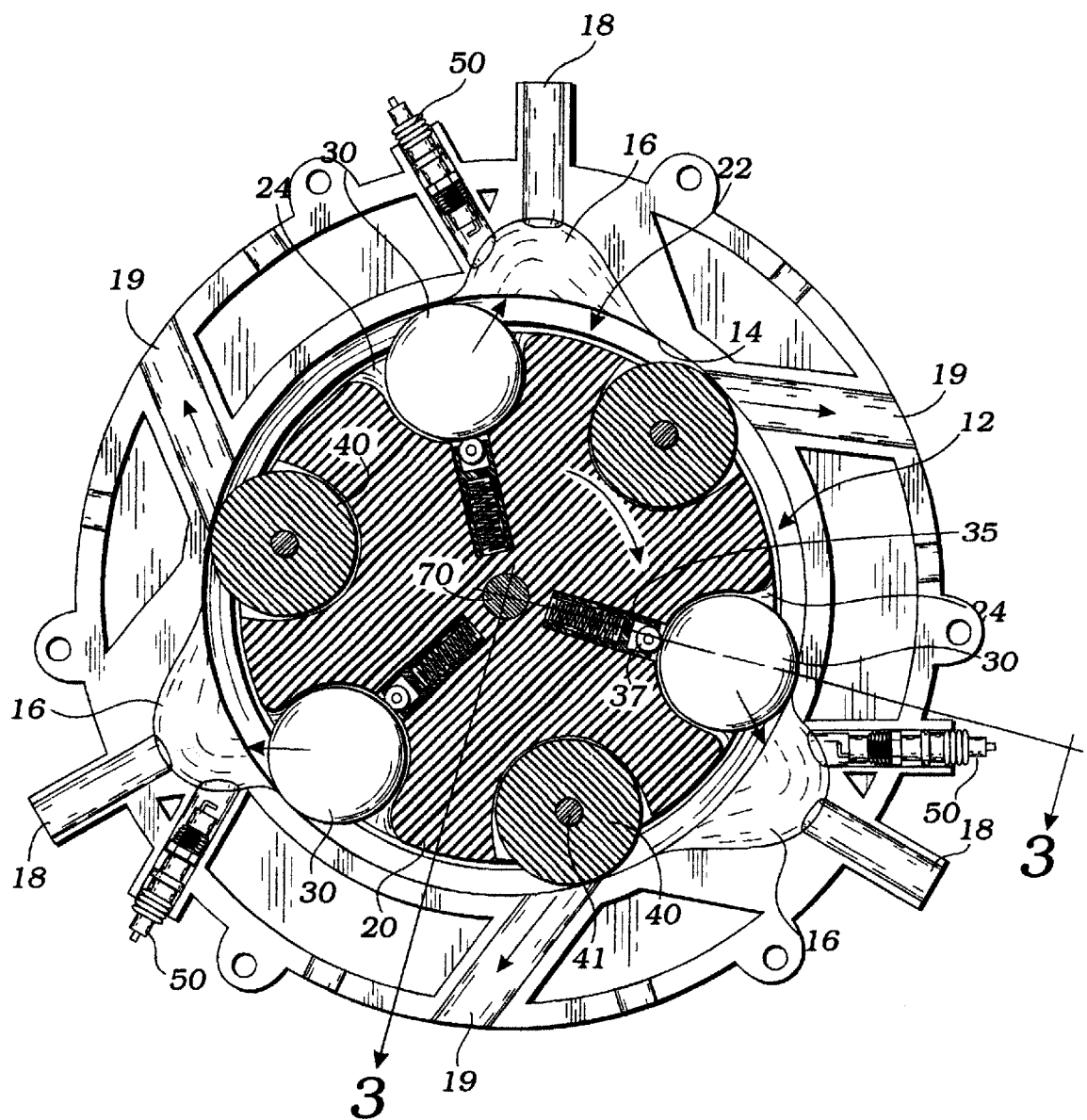
FIG. 2 is similar to FIG. 1, showing the pistons at the termination of exhaust.
Figure 3:
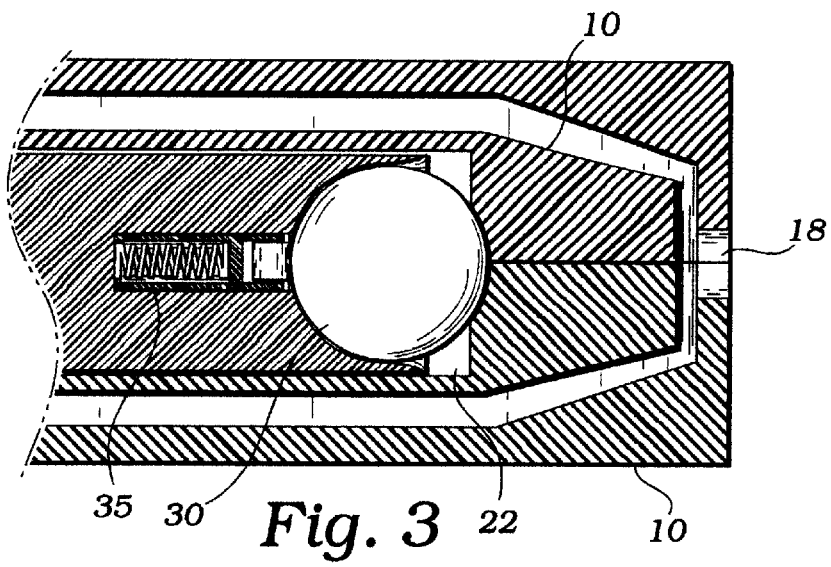
FIG. 3 is an end sectional view thereof showing a piston in the retracted position as taken along line 3—3 in FIG. 2.
Figure 4:
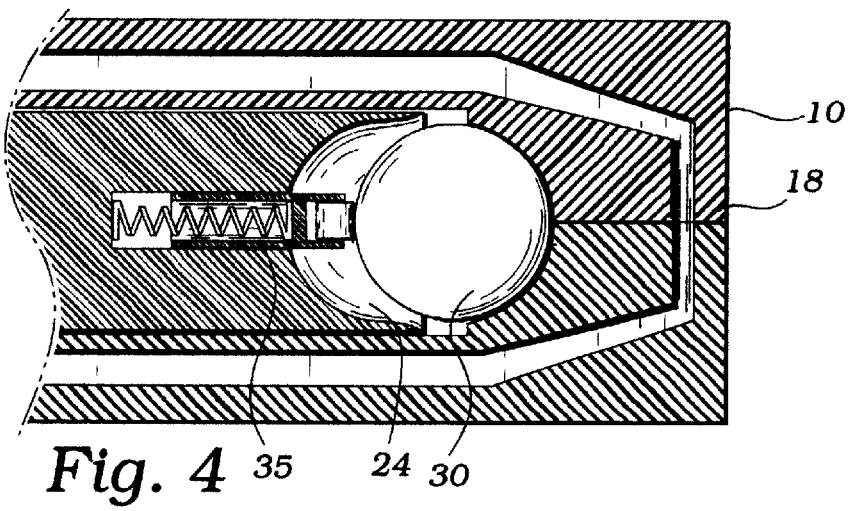
FIG. 4 is similar to FIG. 3 showing a piston in the extended position as taken along line 4—4 in FIG. 1.
Figure 5:
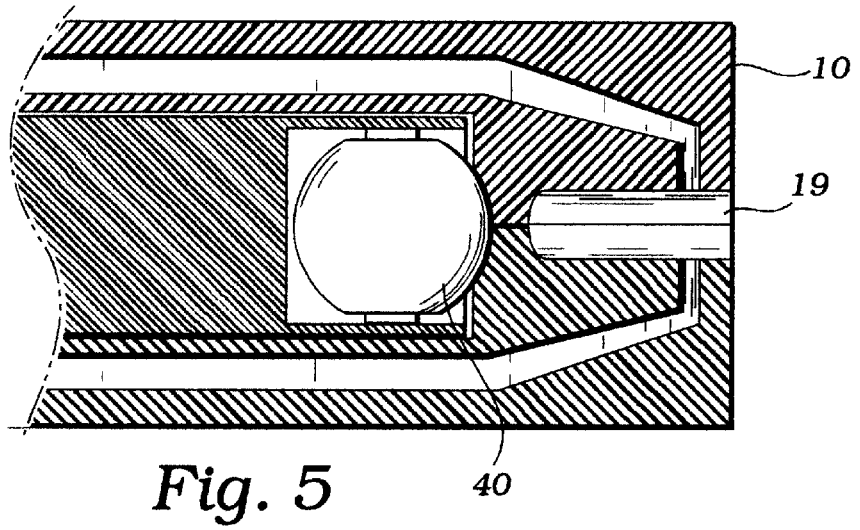
FIG. 5 is an end sectional view taken along line 5—5 in FIG. 1.

Preferably, the interior annular surface 14 is interrupted by a plurality of spaced-apart fuel ignition ports 16, each of which are formed as depressions in the interior annular surface 14 of the engine block 10 and each of the fuel ignition ports 16 accepts a portion of each of the spherical pistons 30 in turn, in rolling contact therewith, as the rotary piston mount 20 rotates within the engine block 10. As each spherical piston 30 reaches top dead center, as shown in FIG. 2, the spark plug 50 ignites a gas mixture injected through a fuel ignition inlet 18 into the fuel ignition port 16. Such fuel injectors are well known in the art. The gas preferably consists of air or oxygen and methane or other fuel such as ethanol, methanol, or hydrogen.

The urging means 35 preferably includes a compression coil spring seated on a thrust washer or equal. As the spherical piston 30 arrives at top dead center of the fuel ignition port 16, the compression coil spring forces the spherical piston radially outwardly with a pressure of 150 psi, into the fuel ignition port 16, thereby compressing the gas mixture and causing it to become volatile and therefore ignite when a spark is at sparkplug 50 which is angled in the direction of rotation of the rotary piston mount 20. The power created by the ignition forces the spherical piston 30 to move against the compression spring 40, providing power to the rotary piston mount 20, thereby causing it to rotate in its direction of rotation and driving the crank shaft 70 with it.

Inventively, each of the urging means 35 provides a roller 37, positioned for pressing against one of the spherical pistons 30 in rolling contact therewith so that friction losses are very low.

Inventively, a roller sealing means 40 is mounted on the rotary piston mount 20 by axle 41 and provides a rolling seal against surface 14. Each of these sealing means 40 rolls in contact with the interior annular surface 14 so as to form and isolate gas pressure zones within the uniform annular circular space 22 as best seen in FIG. 6. It should be noted that gases cannot expand around the sealing means 40 due to the small clearances involved. The time between each gas mixture impulse, expansion and exhaust is small compared to the time for pressure equilibrium around the sealing means 40. The same is true with respect to gas pressure equilibrium around the circular pistons 30 through their respective seats 24.

Further details of the present invention include the following:

The cycle begins injection of oxygen at 10° BTDC at a pulse width of 6.0 ms at 15 psi of pressure and the oxygen flow will end at 9.9994° BTDC. Injection of fuel begins at 10° BTDC at a pulse width of 2.0 ms at 5 psi of pressure and the fuel pulse will end at 9.9998° BTDC. The 2 Oxygen and Fuel Injector Ports are at TDC 90° to the Combustion Chambers TDC with cylindrical dimensions of 0.500" and 0.500" apart from each other. The compressed Ball Piston (compressed by the Cylinder Assembly spherical Ball Guide into the Roller Power Shaft Ball Piston Seat) will begins its rise into the 90° frontal area of the spherical Combustion Chamber under compression from the tension of the Plunger Compression Spring at 9° BTDC. This will begin the compression of the Oxygen and Fuel causing friction under pressure creating a vapor. At 0° BTDC the Spark Plug will ignite causing the pressure in the Compression Chamber to rise again. The Spark Plug Port is a 30° angle into the Combustion Chamber, to provide oxidation pressure clockwise, and 10° from BTDC with cylindrical dimensions of 0.625". At 0° BTDC the Oxidation of the fuel begins creating pressure forcing the Ball Piston to rotate clockwise. The Ball Piston is spherical in shape with 1.000" diameter of 4140 steel and coated with ceramic to provide for combustion temperature control of the Ball Piston. During the rotation of the Ball Piston in the clockwise direction, the Ball Piston forces back into the Roller Power Shaft Ball Piston Seat by the Combustion Chambers 40° slope. This will place the Ball Piston under tension against the Plunger Assembly Compression Spring. The "Zack Cycle" continues for 90° ATDC where the oxidized fuel will exit through the exhaust port. The Exhaust Port exits at 90° ATDC and is at a 30° angle, to provide direct flow, exiting out through the Cylinder Assembly with rectangular dimensions of 1.000" high by 0.500" wide. The "Zack Cycle" completes in 100°. The Roller Power Shaft weight will carry the power to the next "Zack Cycle". 3 "Zack Cycle" take place in one rotation of the Roller Power Shaft for each of the Ball Pistons in each of the 3 Combustion Chambers. With 3 Ball Pistons on the Roller Power Shaft allows for 9 "Zack Cycle" per one rotation of the Roller Power Shaft. The 90° frontal area of the Combustion. Chamber and the 40° slope at rear area of the Combustion Chamber create a one way clockwise rotation. The spherical shaped Combustion Chamber area creates a sealed combustion area because of 100% contact of the Ball Piston. A cooling passage surrounds the Combustion Chamber keeping the chamber at one temperature because of the Ball Piston having 100% contact with the combustion surface. Surrounding the spherical shaped Ball Guide of the Cylinder Assembly is a cooling passage that maintains combustion temperature of the combustion area because the Ball Piston has 100% contact with the Ball Guide cooling area. A Roller Wiper Seal rides ahead of the Ball Piston on the Roller Power Shaft riding against the Cylinder Assembly in the cylindrical Roller Guide to maintain a gas tight seal between the 9 "Zack Cycle's".

The Roller Wiper Seal is of 4140 steel with cylindrical dimensions of 1.595" long by 0.995" round, with an axle at either cylinder end of 0.20" by 0.20". The combined sealing affect of the Ball Piston to the Cylinder Assembly spherical Ball Guide and spherical Combustion Chamber and the Roller Wiper Seal to the Cylinder Assemblies cylindrical Roller Guide provide for 100% sealing.

A Main Bearing is on either side of the Roller Power Shaft to provide a bearing surface and support. Each Main Bearing has a thrust collar to provide a thrust area for the Roller Power Shaft. The Roller Power Shaft has 0.100" rifle drilled passages from the Main Bearing surface to the center of the Roller Power Shaft and then rifle drilled to the Roller Power Shaft Ball Piston Seat and Roller Wiper Seal Groove to provide lubrication. The rifle drilled passage are plug welded with a 4140 steel plug of 0.101" diameter. The Roller Power Shaft has cylindrical Plunger Chamber below the center of the Ball Piston seat for the Plunger Assembly to ride and the Compression Spring to provide tension. The Roller Power Shaft cylindrical dimensions are 4.000" high by 2.000" wide of 4140 steel. The Power shaft dimensions 0.500" by 2.250". The Power Shaft Axial Thrust Collar is 0.750" by 1.350". The spherical Ball Piston Seat is 0.998" deep by 1.005" round. The Roller Power Shaft Plunger Chamber is 1.000" deep by 0.505" wide and is the center of the Ball Piston Seat and begins its dimensions at the 90° bottom of the seat from 0.998". The Roller Wiper Seal groove in the Roller Power Shaft centered with dimensions of 1.600" long by 0.500" deep with Axle Pivots of 0.205" diameter by 0.200" long. The Roller Wiper Seal Groove is 90° from the center of the Ball Piston Seat ATDC.

Below the Compression Spring in the Roller Power Shaft Plunger Chamber is a 3459a bronze Thrust Washer to act as a bearing surface with dimensions of 0.500" cylindrical outside and 0.340" cylindrical inside by 0.050" thick. The Plunger Assembly's Plunger Ball has 100% contact of the Ball Piston providing limited friction with spherical dimension of 0.250" of 4140 steel. The Plunger Assembly is cylindrical shaped with a spherical Plunger Ball Seat at the top 0.130" deep by 0.260" round sphere and a cylindrical Compression Spring Chamber at the Bottom 0.500" deep by 0.375" wide. The Plunger Assembly external dimensions is 0.700" high by 0.500" wide of 4140 steel. The Plunger Compression Spring is 0.750" high with coil dimensions of 0.370' outside circle and 0.350" inside circle and coil diameter of 0.020" with compression of 150 psi. of 4150 alloy steel. The compression spring tension is variable based on the type of fuel utilized.

The Cylinder Assembly external surface is cylindrical shape with dimensions of 4.000" wide by 6.750" high. The internal dimensions of the Cylinder Assembly 4.750" high at the highest points of the Combustion Chamber by 1.005" wide spherical shape, the Ball Guide is 4.125" high by 1.005" wide spherical shape. The Cylinder Assembly Roller Guide is cylindrical shaped with dimensions of 4.005" high by 2.005" wide. The internal Cylinder Walls are 0.250" thick. The Cooling Passages are 0.500" wide. The external Cylinder wall is 0.250" thick. The Cylinder assembly material is J465 310 cast aluminum. The Main Bearing Housing internal dimensions 1.500" deep by 2.002" wide and the external dimensions of 2.502" cylinder. The Main Bearing Housing Cover is cylindrical 2.502" outside circle with 0.510" inside circle by 0.250" thick. A lubricating passage for an external lubricating pump is provided with 0.125" diameter opening.

A Lip Spring Seal rides on the Power Shaft Axial Thrust Collar to seal bearing lubricants from the Combustion Chamber. The Lip Spring Seal inside diameter of 0.750", outside diameter of 2.002" by 0.250" thick.

The Main Bearing material is 51100 steel with outside diameter of 2.000", Power Shaft inside diameter of 0.502" and Axial Thrust Collar inside diameter of 0.752" by 0.100" deep. The Roller Bearing is 0.500" cylinder, and the inner and outer races are 0.250" thick. There is a lubricating passage of 0.100 inside diameter.

A Magnetic Timing Power Shaft Position Sensor bolted to the Cylinder Assembly at TDC just above the Power Shaft. The 3 Magnet Timing Sensor are an AC pickup coil. The Power Shaft has 3 permeable magnets to trigger the sensor. The air gap between the AC pickup coil and the permeable magnet is 0.018". Number 1 pickup coil and permeable magnet is for oxygen injection beginning at 10° ending at 9.9994°. Number 2 pickup coil and permeable magnet is for fuel injection timing beginning at 10° ending at 9.9998°. The third pickup coil and permeable magnet is for ignition timing beginning at 0° ending ignition at 30°.

A Microprocessor provides control of ignition coil timing, oxygen and fuel injection timing, oxygen and fuel on/off control valve relay, cooling fan on/off relay, oil pump on/off relay, water pump on/off relay, alternator charging system on/off relay and the engine starter motor solenoid. An ignition switch provides voltage through a fuse to the individual motors, the microprocessor, injectors, valves, ignition coil, relays, and solenoids.

A cooling radiator and electric motor driven cooling fan are provide to remove combustion heat through an electric motor driven water pump. An electric motor driven oil pump provided to circulate lubricating oil from an external oil reservoir. An electric motor driven alternator provided to charge the battery used to drive the individual motors, starter motor, ignition coil, and microprocessor.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An internal combustion apparatus comprising:

an engine block providing an engine block interior space therein, and an interior annular surface;

a rotary piston mount adapted for rotational motion within the interior space of the engine: block, the rotary piston mount defining a uniform annular circular space between the interior annular surface and the rotary piston mount;

a plurality of spherical pistons adapted for radial reciprocating motion within the rotary piston mount, the spherical pistons urged radially outwardly from the rotary piston mount by an urging means so that the pistons are in rolling contact with the interior annular surface of the engine block; and a sparkplug for producing an expanding gas so as to drive the spherical pistons and the rotary piston mount in rotational motion within the engine block.

2. The apparatus of claim 1 wherein the interior annular surface is interrupted by a plurality of spaced apart fuel ignition ports, each of the fuel ignition ports accepting a portion of each of the spherical pistons in turn, in rolling contact therewith, as the rotary piston mount rotates within the engine block.

3. The apparatus of claim 1 wherein the urging means provides a roller contact portion positioned for pressing against each of the spherical pistons in rolling contact therewith.

4. The apparatus of claim 3 further providing a plurality of roller sealing means, each said sealing means mounted in the rotary piston mount, moving therewith, and positioned between each adjacent pair of the spherical pistons and in rolling contact with the interior annular surface so as to form and isolate gas pressure zones within the uniform annular circular space within the engine block.

* * * * *